United States Patent [19]

Seigler et al.

[11] Patent Number: 5,133,985

[45] Date of Patent: Jul. 28, 1992

[54] FAT SPREAD AND THE PROCESS OF MANUFACTURE

[75] Inventors: Herbert H. Seigler, Huntington Beach; Craig Torres, Victorville; Linzie Starr, Walnut, all of Calif.

[73] Assignee: Saffola Quality Foods, Inc., Los Angeles, Calif.

[21] Appl. No.: 764,102

[22] Filed: Sep. 10, 1991

Related U.S. Application Data

[63] Continuation of Ser. No. 536,525, Jun. 12, 1990, abandoned.

[51] Int. Cl.$^5$ ............................................. A23D 00/00
[52] U.S. Cl. ...................................... 426/581; 426/603
[58] Field of Search ................ 426/581, 602, 603, 613

[56] References Cited

U.S. PATENT DOCUMENTS 4,112,132 9/1978 Badertscher et al. ............... 426/613
4,388,339 6/1983 Lomneth et al. .................... 426/603

Primary Examiner—Donald E. Czaja
Assistant Examiner—Helen Pratt
Attorney, Agent, or Firm—Lyon & Lyon

[57] ABSTRACT

A process for the manufacture of a butter-like product which is low in fat. The product is formed from butter and an aqueous phase which are combined in a two-phase emulsion by melting, mixing through agitation to achieve an emulsion and chilling to 70° F. The product is formed from 80% butter combined with water, salt and nonfat dry milk which is in the aqueous phase with water in a ratio of about 0.015 to 1.

20 Claims, 1 Drawing Sheet

FAT SPREAD AND THE PROCESS OF MANUFACTURE

This is a continuation of co-pending application Ser. No. 07/536,525, filed on Jun. 12, 1990, now abandoned.

BACKGROUND OF THE INVENTION

The field of the present invention is fat spreads and the manufacture of fat spreads.

Two fat spreads comprise the bulk of the consumer market in these goods. Butter and margarine. Butter is subject to a federal standard requiring a minimum of 80% fat. In today's health conscious environment, it has become generally understood that a diet reduced in fat content is beneficial. The level of fat in butter has been a continuing drawback to its use.

Margarine has made substantial inroads into the butter market. Margarine is a water and oil emulsion, taking its character from the continuous oil phase. The presence of oil rather than butter fat has made this spread appealing to many consumers. Further, the selection of vegetable oil may also be made to eliminate cholesterol content and the like.

In margarine, the aqueous phase is a blend of water, salt (optional), whey (optional) and various other ingredients such as buttermilk and milk powder to enhance the flavor. The aqueous phase may contain various preservatives such as sodium benzoate, potassium sorbate, citric acid or EDTA. The oil phase is a blend of liquid vegetable oil (typically soybean), partially hydrogenated vegetable oil (typically soybean), lecithin (optional), mono and diglycerides (optional), beta carotene, vitamin A and natural or artificial flavor. Margarine is manufactured by combining the aqueous phase ingredients in a mix tank which is then pasteurized. The oil phase ingredients are combined in a tank, heated and agitated. The oil phase and aqueous phase are then separately pumped to a calibrated metering system. The oil and aqueous phases are here blended proportionally to create a water and oil emulsion. The emulsion is pumped from a holding tank to a scraped surface heat exchanger which quickly chills and crystallizes the emulsion.

The scraped surface heat exchanger system can be basically described as a two-part system. In the first part, the emulsion enters the chiller tube at a temperature of 90° F. As it passes through the chrome plated tubes, it is cooled. The dwell time is approximately 1 to 2 minutes. At this point, the emulsion temperature has been decreased to 45° to 50° F. The chrome plated tubes combine a heat exchanger with a mixing mechanism. The heat of the emulsion is removed as it is agitated and propelled into contact with the cold surface of the tubes. In the second part of the system, the emulsion is pumped into a container where the emulsion is tempered by brief and intermittent agitation. During this phase, the chilled fat crystals begin to form a crystallized matrix. During crystallization, the particles of oil become extremely small and they entrap the tiny droplets of water liquid. The margarine is then packed into tubs or cubes at about 45° F.

SUMMARY OF THE INVENTION

The present invention is directed to the manufacture of a fat spread which has the appearance, taste and performance of butter but which is reduced in fat content without requiring emulsifiers. To this end, a fat spread has been developed which has a fat content of between 52% and 75% by weight for cubes and as low as 40% for tub packing. Only at the lower range would emulsifiers be advantageous. The fat content is contributed by the blending of butter with an aqueous mix. Properly formed, this mixture has substantially the same taste, appearance and performance of whole butter.

A process has been developed for the preparation of such a spread. The process contemplates the carefully controlled melting and mixing of butter with an aqueous mixture of water and milk solids. Salt and vitamin A may also be added. From the melted state, the mixture is chilled to approximately 70° F. with agitation to form an emulsion. The chilled product is extruded into any selected form with an extrusion pressure of about 250 psi. This operation results in a product which is reduced in fat content but which may be used like butter.

In other aspects of the present invention, the fat content may be specifically selected for the final product to be approximately 64% by weight. The aqueous mixture may include nonfat dry milk as well as salt which may be pasteurized and then thoroughly blended in with butter.

Accordingly, it is an object of the present invention to provide a butter-like fat spread which is low in fat. A process for the manufacture of such a spread is a further object of the present invention. Other and further objects and advantages will appear hereinafter.

DETAILED DESCRIPTION OF THE PREFERRED EMBODIMENT

Figure 1:
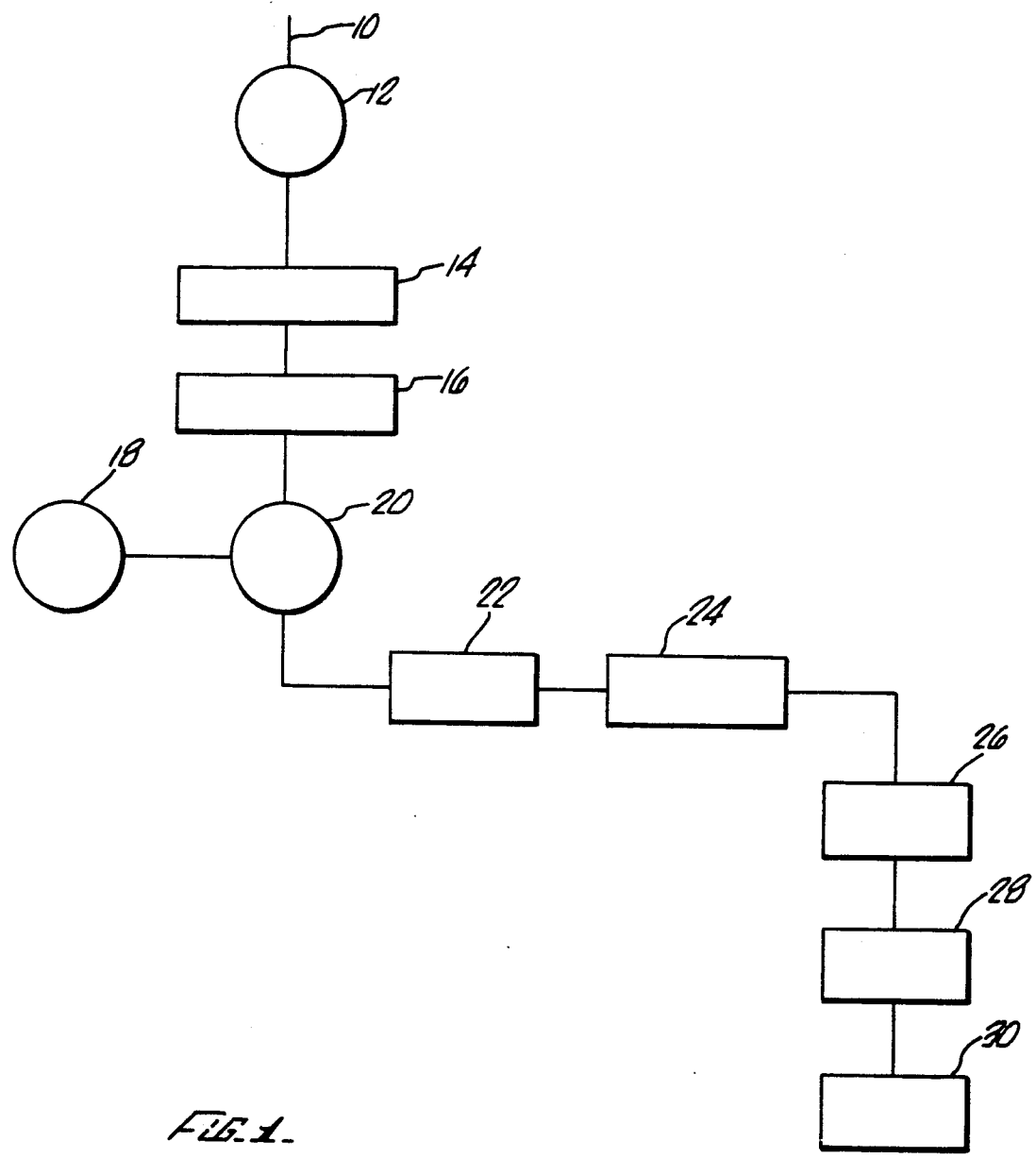
FIG. 1 is a flow chart of a process for the manufacture of the fat spread.

In producing a low fat butter product, a preferred mixture of components by weight is as follows: Butter (Grade AA) 79.9990%, water 19.4997%, nonfat dry milk 0.2999%, salt 0.1999%, vitamin A palmitate 0.0015%. With butter having a minimum fat content of 80%, the foregoing mixture has a fat content of 64%. The optimum mixture of ingredients is a compromise between reduced fat content and performance of a product like natural butter. This performance is principally dependent upon the fat content and the physical nature of the emulsion. When the fat content becomes too low, the spread product becomes brittle and otherwise unlike a butter product, i.e., does not taste or have cooking properties like natural butter, or will not retain the form of a cube. Consequently, the preferred range of fat is from 52% to 75% by weight for cubes and 40% to 75% for tubs. A fat content of 64% by weight falls within this range and provides a mixture which may be reliably emulsified to achieve a butter-like spread. Below 60% fat by weight, some emulsifiers may be advantageous so as to retain product shape.

The formation of a low fat butter product using the foregoing ingredients requires very careful control to achieve an emulsion which presents the characteristics of butter. An aqueous mix is prepared and mixed with butter to achieve the appropriate fat content. The agitated mixture is chilled and then extruded to form. Once formed, the product may be further cooled for storage, vending and use.

The aqueous mix is made by weighing the proportional amounts of each ingredient, water, salt and milk solids, into a processing tank. The mixture is agitated to thoroughly dissolve or suspend the components in the water. Following mixing, the aqueous mix is pasteurized. A temperature of 160°-165° F. for 10-15 seconds in a plate heat exchanger provides an efficient pasteurization. The aqueous mix is then added to butter and the mixture agitated.

The butter is typically received in 68 lb. bulk cubes. The butter is preferably cut into smaller pieces to facilitate melting. The butter is then melted in a processing tank. The butter must not exceed 98° F. Consequently, visual monitoring of the melting process is generally preferred. If the butter exceeds 98° F., the emulsion is unlikely to reform.

The aqueous mix and butter in predetermined quantities are combined and agitated to form an emulsion. Margarine agitation equipment is contemplated for use in this process. The emulsion resulting from the agitated mixture of butter and aqueous mix is then chilled to 70° F. by circulation of the mixture through a refrigeration-cooled, scraped surface heat exchanger at 7000 lbs. per hour. A common such heat exchanger as employed in the preparation of margarine is contemplated. Such a heat exchanger is commonly referred to as a "Gerstenberg".

As the product is chilled in the heat exchanger, the extrusion pressure of the chilled mixture increases to 250 psi at 496 rpm. The product is then transferred into a crystallizing tube which extrudes the mixture into a preselected package. Such a package may be for quarter pound sticks or tubs of product. When quarter pound sticks are to be made, a packing machine is employed which forms the wrapper into the appropriate shape before introduction of the product. The spread is then injected into that properly-shaped wrapping to form the cube. One such available machine for packaging is a Corazza type packing machine. The extrusion of product into a preformed wrapper allows for the running of a much softer product than other generally accepted processes where the stick is formed and then wrapped. A softer product at this point is important to prevent the finished product from being very brittle, e.g., when sliced.

Looking to the flow diagram of FIG. 1, a water inlet 10 leads to a makeup and mixing tank 12 in which water, nonfat dry milk and salt may be mixed. A pasteurizer 14 pasteurizes the aqueous mix from the tank 12 and delivers the pasteurized mix to a holding tank 16. Butter is provided via a tank 18. The products are measured into the emulsion tank 20 where the aqueous mix and melted butter is agitated at a temperature not to exceed 98° F. Once emulsified, the mixture is chilled through a Gerstenberg pump 22 and heat exchanger 24. Following chilling of the mixture to about 70° F., it is directed to a Corazza machine 26 for packaging. The packages are then presented to a case packer and sealer 28 and a palletizing station 30.

The preparation of the emulsion and the range of fat content provide for a spread which approximates butter but is lower in fat. Depending on the exacting control of the process, a relatively low fat percentage may be employed. Some of the characteristics which must be evaluated in determining the acceptability of such a low fat product are the flavor, the body, the color and the salt content. With these factors in mind, a properly prepared product emulsion may be achieved with a minimum fat content.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A process for the preparation of a fat spread comprising the steps of
    mixing water and nonfat dry milk to form an aqueous mix;
    pasteurizing the aqueous mix;
    heating formed butter to melting not to exceed 98° F.;
    mixing pasteurized aqueous mix with the butter to obtain a fat content of between about 52% to 75% by weight;
    agitating the mixture of pasteurized aqueous mix and butter to form an emulsion;
    chilling the emulsion to a soft solid state;
    extruding the chilled emulsion into a preselected form.

2. The process of claim 1 wherein the step of mixing water and nonfat dry milk includes the mixing of a ration of nonfat dry milk to water of 0.015 to 1.

3. The process of claim 1 wherein said step of mixing water and nonfat dry milk additionally includes the mixing of salt into the aqueous mix.

4. The process of claim 1 wherein the step of pasteurizing the aqueous mix is conducted at a temperature of approximately 160°-165° F. for 10-15 seconds.

5. The process of claim 1 wherein the step of mixing pasteurized aqueous mix with butter is to obtain a fat content of about 64% by weight.

6. The process of claim 1 wherein said step of chilling is to 70° F.

7. The process of claim 1 wherein said step of extruding the chilled mixed butter and aqueous mix is at an extrusion pressure of 250 psi.

8. A fat spread comprising, in emulsion, butter including fat, which once formed has not been heated to in excess of 98° F.;
    water;
    about 0.3% by weight nonfat dry milk;
    salt, the content of said butter fat being between about 40% and 75% by weight.

9. The fat spread of claim 8 wherein said butter fat is at least 60% by weight.

10. The fat spread of claim 8 wherein said butter fat is about 64% by weight.

11. A fat spread comprising, in emulsion,
    butter including butter fat, which once formed has not been heated to in excess of 98° F.;
    water;
    about 0.3% by weight nonfat dry milk;
    salt, the content of said butter fat being at least 60% by weight and the spread having substantially no emulsifier.

12. A fat spread consisting of approximately by weight in emulsion
    80% butter, which once formed has not been heated to in excess of 98° F.;
    19.5% water;
    0.3% nonfat dry milk;
    0.2% salt;
    a trace amount of vitamin A.

13. A process for the preparation of a butter fat spread comprising the steps of
    mixing water and nonfat dry milk to form an aqueous mix consisting essentially of about 98.5% water and 1.5% nonfat dry milk;
    pasteurizing the aqueous mix;

heating formed butter to melting not to exceed 98° F.;

mixing pasteurized aqueous mix with the butter to obtain a fat content of between about 52% to 75% by weight;

agitating the mixture of pasteurized aqueous mix and butter to form an emulsion;

chilling the emulsion to a soft solid state;

extruding the chilled emulsion into a preselected form.

14. A process of claim 13 wherein said step of mixing water and nonfat dry milk additionally includes the mixing of salt into the aqueous mix.

15. The process of claim 13 wherein the step of mixing pasteurized aqueous mix with butter is to obtain a butter fat content of about 64% by weight.

16. The process of claim 13 wherein said step of chilling is to 70° F.

17. The process of claim 13 wherein said step of extruding the chilled emulsion is at an extrusion pressure of 250 psi.

18. The fat spread of claim 8 wherein said spread is formed as a stick.

19. The fat spread of claim 11 wherein said spread is formed as a stick.

20. The fat spread of claim 12 wherein said spread is formed as a stick.

* * * * *

UNITED STATES PATENT AND TRADEMARK OFFICE
CERTIFICATE OF CORRECTION

PATENT NO. : 5,133,985
DATED : July 28, 1992
INVENTOR(S) : SEIGLER et al.

It is certified that error appears in the above-identified patent and that said Letters Patent is hereby corrected as shown below:

In claim 2 (col. 4, l. 21) delete "ration" and insert therefor -- ratio --.

In claim 8 (col. 4, l. 37) after "ing" insert -- butter --.

Signed and Sealed this

Sixteenth Day of November, 1993

Attest:

BRUCE LEHMAN

*Attesting Officer*   *Commissioner of Patents and Trademarks*